May 15, 1951   A. R. NEDOH   2,553,267
SHEAR DIAPHRAGM RELIEF UNION
Filed Oct. 9, 1946
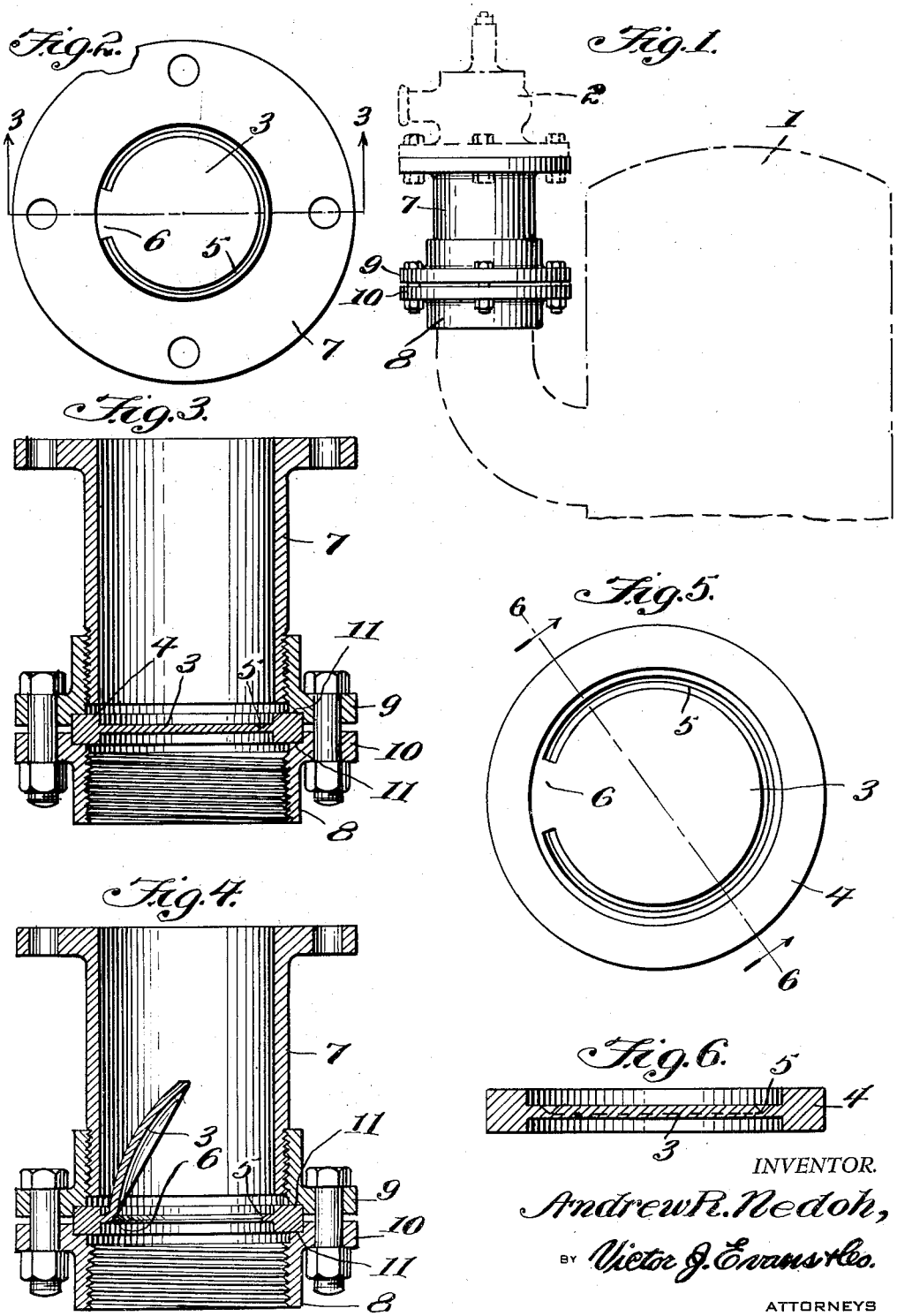
INVENTOR.
Andrew R. Nedoh,
BY Victor J. Evans & Co.
ATTORNEYS Patented May 15, 1951

2,553,267

UNITED STATES PATENT OFFICE 2,553,267

SHEAR DIAPHRAGM RELIEF UNION

Andrew R. Nedoh, Barberton, Ohio

Application October 9, 1946, Serial No. 702,337

1 Claim. (Cl. 220—89)

This invention relates to devices for relieving pressure, and more particularly to the provision of a shearing diaphragm relief union.

It is an object of the invention to provide a practical means for relieving excessive pressures from a pressure vessel, and also to be used beneath relief valves or safety valves as a means of keeping such valves clean so that upon actuation of the diaphragm, the valves will actuate positively due to their clean condition.

A further object is the provision of a diaphragm which can be used on pressure vessels without using relief or safety valves.

A further object is to provide a shearing diaphragm which is hinged so that it will not enter the relief or safety valve.

These and other objects are attained by the novel construction and arrangement of parts hereinafter described and illustrated by the accompanying drawings, forming a part hereof, and in which:

Fig. 1 is a view of a pressure vessel having a shearing diaphragm embodying the invention attached thereto.

Fig. 2 is a plan view of the shearing diaphragm, and clamps for connecting the device to a safety valve or the like.

Fig. 3 is a sectional view taken on line 3—3 of Fig. 2.

Fig. 4 is a view similar to Fig. 3, showing the diaphagm after being sheared.

Fig. 5 is a plan view of the shear diaphragm.

Fig. 6 is a sectional view taken on the line 6—6 of Fig. 5.

Referring to the drawings, in Fig. 1 is shown a pressure vessel 1 in dotted lines, having associated therewith a conventional safety or relief valve 2, also shown in dotted lines. Positioned between the safety valve 2 and the vessel 1 is the shearing diaphragm, which is of a non-frangible material. The diaphragm or web 3 is connected to a ring 4 and has a groove 5 adjacent its connection with the ring except for a short portion 6 which serves as a hinge when the diaphragm shears. See Figs. 4. and 5.

Unions 7 and 8 connect the valve and the vessel 1, and the diaphragm is interposed between the unions by clamping rings or flanges 9 and 10 having internally threaded sleeves extended therefrom and which are substantially the same shape. Each of the clamping rings is provided with a groove or annular recess to receive the ring 4, the grooves or recesses 11 receiving the ring for positive engagement and proper centering of the diaphragm.

The diaphragm is constructed to shear at predetermined pressure for given diameters, thicknesses, etc., by rolling, spinning, or machining.

In operation, when the predetermined shear pressure has been reached, the diaphragm will shear along the groove 5, but will not enter the chamber 7 or the valve 2, as it is prevented from doing so by the hinge portion 6, which may be of greater thickness than the main portion of the diaphragm. The chamber 7 it will be seen is an essential part of the device as it provides means for separating the diaphragm sufficiently from the safety valve so that the sheared diaphragm will not interfere with the operation of the valve.

It will be seen that there has been provided a positive actuating shear diaphragm which will keep safety valves and the like clean to insure proper actuating of the valve. The diaphragm and associated structure are simple and obviously can be applied in numerous situations where the control of pressures is desired.

The above description is to be considered as illustrative and not limitative of the invention of which modifications can be made without departing from the scope and spirit of the invention as set forth in the appended claim.

The invention having been described, what is claimed is:

In a relief union, the combination which comprises a pair of abutting flanges having annular recesses in the inner edges and having internally threaded sleeves extended therefrom, a ring having a web extended across the center thereof and said web having an annular incomplete weakening groove therein, the ends of said annular weakening groove being spaced apart a sufficient distance to provide a hinged section of the same thickness as that of the web whereby upon bursting of the web by excessive pressure the intermediate part of the web is retained by the said hinged section, and bolts extended through the said flanges clamping the said ring in the recesses of the flanges.

ANDREW R. NEDOH.

REFERENCES CITED

The following references are of record in the file of this patent:

UNITED STATES PATENTS

| Number | Name | Date |
|---|---|---|
| 138,171 | Matthews | Apr. 22, 1873 |
| 1,022,301 | Campbell | Apr. 2, 1912 |
| 1,488,671 | Hale | Apr. 1, 1924 |
| 1,584,523 | Egbert | May 11, 1926 |
| 1,951,897 | Binckley | Mar. 20, 1934 |
| 2,474,826 | Cantlin | July 5, 1949 |